ён
2,971,024
METHOD OF ALKYLATING ESTERS

Harold E. Zaugg, Lake Forest, Floyd C. Garven, Gurnee, Adolph O. Geiszler, Mundelein, and Kenneth E. Hamlin, Lake Bluff, Ill., assignors to Abbott Laboratories, North Chicago, Ill., a corporation of Illinois No Drawing. Filed June 18, 1958, Ser. No. 742,736

7 Claims. (Cl. 260—485)

This invention relates broadly to an improved method of introducing a hydrocarbon group into an organic compound of the class exemplified by malonic ester, acetoacetic ester, other β-keto esters and α-cyano esters which have an active hydrogen atom and more particularly to an improved method of introducing an alkyl, an alkenyl, an aralkyl, or aryl group into compounds of the class exemplified by malonic ester, acetoacetic esters, other β-keto esters and α-cyano esters at a carbon atom thereof having an active hydrogen and which is also alkyl substituted.

Heretofore the organic compounds to be alkylated, alkenylated or aralkylated were converted to the metallo derivative and to a solution of said derivative in an alcoholic or hydrocarbon solvent was then added the appropriate halide or disulfate and the reaction mixture heated, usually at refluxing temperature for prolonged periods, until the mixture was no longer alkaline. In some instances, special solvents, such as dialkyl carbonates, were employed. These reactions, however, generally required many hours of refluxing and resulted in a relatively expensive product. The latter is particularly true where it was necessary to prepare the dialkylated ester compounds by introducing a second alkyl group onto a carbon atom which was already monoalkylated, such as when alkylating a diethyl alkylmalonate, where heretofore it has been necessary to introduce the alkyl groups in a specific order and to use relatively expensive alkylating agents.

It is therefore an object of the present invention to provide a more economical method of introducing an aliphatic, alkenyl, aralkyl, or aryl group into an organic compound having an active hydrogen atom.

It is also an object of the present invention to provide a method of more rapidly introducing an aliphatic, an alkenyl, an aryl, or an aralkyl group into an organic compound having an active hydrogen atom.

It is still another object of the present invention to provide a more convenient method of preparing an alkylated, alkenylated, arylated, or aralkylated organic compound of the malonic ester type.

It is a still further object of the present invention to provide a more convenient and economical method of introducing a second alkyl group into a mono-substituted malonic ester.

Other objects of the present invention will be apparent from the detailed description and claims to follow.

It has now been found that if the metallo derivatives of organic compounds having an active hydrogen atom, including the more difficultly alkylated malonic esters useful in the preparation of barbituric acid compounds, are reacted with an alkyl, alkenyl, aryl, or aralkyl halide or a dialkyl, dialkenyl, diaryl, or diaralkyl sulfate in the presence of a soluble reaction catalyst, the reaction proceeds rapidly to completion in only a small fraction of the time required by the prior art processes, and without reducing the yields of the desired product and generally with increased yields of the desired product. It is also made commercially feasible to use less expensive alkylating agents than heretofore.

The process of the present invention can be represented by the following general equation:

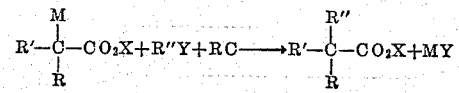

wherein R is hydrogen or an organic group, R' is an activating organic group, such as an ester, keto, cyano, or phenyl group, M is a metal, X is an organic esterifying group, R" is an alkyl, cycloalkyl, alkenyl, cycloalkenyl, aryl, or aralkyl group, Y is a halogen or an alkyl sulfate, alkenyl sulfate, aryl sulfate, or aralkyl sulfate group, and RC is an alkylation reaction catalyst consisting of an organic compound devoid of active or acidic hydrogen atoms and which contain within the molecule a substantially rigid unbranched linear or curvilinear, diatomic or triatomic dipole; said dipole possessing as its negatively charged terminus, an oxygen atom with sufficient basicity and electron donor capacity, to be detectable by means of potentiometric titration with perchloric acid in acetic anhydride medium. Among the alkylation catalysts possessing the foregoing attributes and properties are dimethylformamide (DMF), dimethylacetamide (DMAC), dimethylsulfoxide (DMSO), tetramethylurea, N-formylpyrrolidine, trimethylphosphine oxide, pyridine N-oxide, hexamethylphosphoramide, N-formylpiperidine, N,N-dimethylbenzamide, N-methyl-epsilon-caprolactam, N-methyl-2-piperidone, N-methyl-2-pyrrolidone, N-methyl-2-pyridone. Other alkylation catalysts will be apparent from the accompanying discussion and examples listed and set forth in the specification.

In the case where

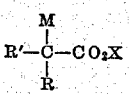

is a malonic ester metallo derivative, the reaction can be shown as follows:

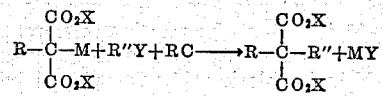

wherein R, M, X, R", Y, and RC have the above-defined values.

The M group in the foregoing general formulae is usually sodium. However, other metallo derivatives can be used, such as the other alkali metal and the alkaline earth metal derivatives which are readily prepared by using the alcoholates or hydrides thereof in the same manner as sodium ethylate or sodium hydride.

In accordance with the foregoing general statement of the present invention Table I lists the relative pseudo-first-order reaction rates of alkylation at 30° of sodio-1-methylbutylmalonic ester with ethyl bromide in the presence of 0.648 M concentrations of various additives in a benzene solution. The rate of the alkylation in benzene alone is taken as unity. Also listed are the dipole moments of some of the additives and their dielectric constants as measured on the pure substances.

TABLE I

| Additive | Dielectric Constant | Dipole Moment | Initial Molarity of NA deriv. | Rate Constant at 30° ×10⁵ sec.⁻¹ | Relative Rate (C₆H₆=1) |
|---|---|---|---|---|---|
| No additive (benzene solution) | | | | 1.29±0.02 | 1.0 |
| 1. (C₂H₅O)₂CO | 3 | 0.9 | 0.120 | 1.55±0.06 | 1.2 |
| 2. CH₃CN | 39 | 3.2 | 0.123 | 2.14±0.58 | 1.7 |
| 3. (CH₃)₂CO | 21 | 2.8 | | | 2.0 |
| 4. (CH₃)₂NNO | 54 | 3.98 | | | 2.2 |
| 5. C₆H₅NO₂ | 36 | 4.0 | 0.127 | 3.16±0.21 | 2.5 |
| 6. C₂H₅OH | 25 | 1.7 | | | 2.8 |
| 7. C₆H₅CN | 26 | 3.9 | 0.127 | 4.13±0.47 | 3.2 |
| 8. (CH₃)₂NCON(CH₃)₂ | | 3.3 | 0.124 | 7.08±0.07 | 5.5 |
| 9. HCON(CH₃)₂ | 27 | 3.80 | 0.122 | 7.30±0.40 | 5.8 |
| 10. (CH₃)₂SO | 45 | >3 | 0.117 | 8.16±0.22 | 6.3 |
| 11. CH₃CON(CH₃)₂ | | 3.87 | 0.123 | 9.98±0.08 | 7.3 |
| 12. HCON⟨ | | | 0.125 | 10.5 ±0.3 | 8.1 |
| 13. (CH₃)₃PO | | >3.5 | 0.120 | 13.5 ±0.7 | 11 |
| 14. ⟨⟩N⁺–O⁻ | | 4.2 | 0.117 | 15.8 ±0.2 | 13 |
| 15. [(CH₃)₂N]₃PO | | | 0.119 | 27.8 ±0.7 | 21 |

The alkylation reaction rates in Table I were determined by preparing diethyl ethyl-1-methylbutylmalonate by the procedure which comprised adding to a solution of 10 ml. of diethyl 1-methylbutylmalonate in 100 ml. of dry thiophene-free benzene in a 250 ml. three-neck round bottom flask equipped with a stirrer, drying tube and nitrogen inlet tube excess (1.3–1.5 g.) sodium hydride. The reaction was allowed to stir overnight at room temperature in an atmosphere of dry nitrogen. After unreacted sodium hydride was allowed to settle, the solution of the sodium derivative was drawn by vacuum into a dry 100 ml. pipette from which the tip had been removed in order to allow for insertion of a plug of glass wool into the lower part of the stem. The solution was then transferred to a nitrogen filled 125 ml. conical flask and placed in a constant temperature bath held at 30°±0.02°.

To a 100 ml. volumetric flask containing 30 ml. of ethyl bromide previously placed in the thermostat was added either a weighed amount of the additive or a standard solution of it in benzene, the quantity being determined by the multiple of 0.324 M which was needed for the final concentration. When dimethylformamide was used as the additive, 5 ml. of the pure liquid was pipetted directly into the reaction flask to make a concentration 0.648 M (5% DMF by volume).

To this mixture was added 30 ml. of the stock solution of the sodium derivative followed immediately by enough dry benzene to make 100 ml. The solutions were then well mixed, and at intervals, 3 ml. aliquots (anywhere from 8 to 11 in all) of the reaction mixture were withdrawn by means of a pipette, added to water and titrated with 0.02 N hydrochloric acid using phenolphthalein indicator. The slope and standard deviation of the plot of the logarithm of the concentration of the sodium derivative against time in seconds was calculated by the statistical method of least squares. Multiplying this slope by the factor, −2.303, gave the first-order rate constant directly.

From this Table I it is evident that there is no direct correlation of the catalytic effectiveness of these additives on the one hand with either dielectric constant or dipole moment on the other. However, it can be seen that all of the more effective additives do have relatively high dipole moments of 3.3 or better. It can be concluded that the presence of a dipole in the molecule is a necessary but not sufficient condition for catalytic efficiency. In other words, a particular kind of dipole must be present to endow the compound with catalytic properties.

An indication of the type of dipole necessary for this action comes from an examination of the refractions of the atomic groupings which are primarily involved in the separation of electrical charges. It is generally agreed that the molar refraction of a compound or the individual bond refraction of a portion of a molecule is a measure of its electron polarizability (cf. C. P. Smyth, "Dielectric Constant and Molecular Structure," Chemical Catalog Co., New York, N.Y., 1931, pages 142–168). In general, the smaller the algebraic value for the refractivity of a bond, the smaller is its electron polarizability, or, in other words, the more tightly are the electrons held which make up that bond. By making suitable measurements and calculations, the bond refractions for the >C=O bond in acetone for the —C≡N bond in acetonitrile, for the —C≡N bond in benzonitrile, for the >S→O bond in dimethylsulfoxide, and for the P→O bond in trimethylphosphine oxide can be determined. These are listed in Table II. It can be seen that, al-

TABLE II

| Bond | Refractivity | Relative Catalytic Efficiency |
|---|---|---|
| —C≡N in Compound #2 of Table I | +4.77 | 1.7 |
| >C=O in Compound #3 of Table I | +3.46 | 2.0 |
| —C≡N in Compound #7 of Table I | +5.77 | 3.2 |
| >S→O in Compound #10 of Table I | +0.74 | 6.3 |
| >P→O in Compound #13 of Table I | −3.68 | 11 | though the correlation is not quantitative, the two effective catalysts (Compound #10 and Compound #13) possess dipoles that are much more rigid than the three relatively ineffective ones (Compounds #2, #3 and #7).

The same relationship holds for compounds, such as N,N-disubstituted amides, which possess triatomic dipoles rather than diatomic ones. It is well known that the structure of an amide grouping cannot be truly represented by the single usual formula, —CON<, but must be denoted as a hybrid made up of contributions from the three resonance forms,

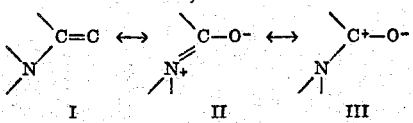

It has been calculated by L. Pauling that the contribution of the dipolar Form II (triatomic dipole) results in a stabilization of the amide linkage of the order of 20 kilocalories per mole. In other words, most amides have an energy content of the order of 20 kcal./mole less than they would if only Forms I and III were adequate representations of the resonance forms. This means that Form II is an important contributor to the actual structure of all amides and accounts in large part for the fact that amides possess larger dipole moments than do other carbonyl compounds such as ketones, carboxylic acids and esters.

Yet, it can be demonstrated that relative contributions of Form II can vary from one amide to another. Gutowsky and Holm ["J. Chem. Phys.," 25, 1228 (1956)] have shown by means of nuclear magnetic resonance studies that in different amides differing capabilities for rotation of the carbon-nitrogen bond are present. In resonance Forms I and III, rotation about the carbon-nitrogen bond is quite free since it is a single bond in both cases. However, in Form II, such rotation would be impossible because the carbon-nitrogen bond is a double bond. It would therefore be expected that with increasing contribution of Form II to the actual state of the molecule, rotation about the carbon-nitrogen bond would become increasingly difficult. Gutowsky and Holm have shown that the barrier to rotation about the carbon-nitrogen bond in dimethylformamide $$[HCON(CH_3)_2]$$

and in dimethylacetamide $[CH_3CON(CH_3)_2]$ are 7 kcal./mole and 12 kcal./mole, respectively. It can be seen from Table I that this is the relative order of increasing catalytic activity of these two additives. Furthermore, these workers found that in N-methylformanilide $[HCON(CH_3)C_6H_5]$ no detectable rotational energy barrier at room temperature could be perceived by their experimental method. It has been found that N-methylformanilide is a relatively ineffective alkylation catalyst.

It should be added, further, that an examination of the infrared absorption spectra of a large number of amides as well as a comparison of the measured with the calculated molar refractions of a series of amides has provided further evidence of the necessity for the presence of an unbranched, electrically rigid, linear dipole in a molecule in order to assure activity as an alkylation catalyst.

Nevertheless, a few inconsistencies in the correlation indicate that consideration of the linear dipole is not the only factor of prime importance. By introduction of another prime factor, however, the relative activities of a large number of alkylation catalysts can be fitted into a consistent, rational picture.

The most glaring inconsistency in the foregoing picture, if only the rigid dipole is considered to be of importance, is the case of dimethylnitrosamine $$[(CH_3)_2NNO]$$

To be sure, this compound differs structurally from any of the other compounds used as catalysts. Yet, it possesses all of the necessary qualifications for a good catalyst as specified by consideration of linear dipoles values. Looney, Phillips, and Reilly ["J. Am. Chem. Soc.," 79, 6136 (1957)] have shown by nuclear magnetic resonance studies that the barrier to rotation about the nitrogen-nitrogen bond amounts to 23 kcal./mole. This means that the dipolar form, $$(CH_3)_2\overset{+}{N}=N\diagdown_{O^-}$$

contributes a great deal to the actual state of the molecule. This view is further consistent with the relatively high dipole moment of this substance (Table I, Compound 4). Yet, it is a poor alkylation catalyst. The reason for this is a lack of basicity or electron-donor capacity in the substance.

Table III lists a number of compounds which were tested as catalysts in the alkylation of sodio-n-butylmalonic ester with n-butyl bromide at 25°. The relative rates refer to the reaction rates measured in benzene solution containing 0.324 M (2.5% by volume for DMF) concentrations of the catalysts. As in Table I, the rate in benzene alone is arbitrarily taken as unity. In the third column of Table III are listed the half-neutralization potentials of the compounds determined by potentiometric titration with perchloric acid in acetic anhydride. It has been shown [cf. Streuli, "Anal. Chem.," 30, 997 (1958)] that for a number of weakly basic substances, including amides, the base strengths are inversely proportional to their half-neutralization potentials. Thus in Table III, the lower the E 1/2 the stronger the base. However, this is quantitatively true only among compounds within a given group of Table III. For technical reasons, the quantitative comparison of half-neutralizations of compounds in different groups cannot be made. Some compounds in Table III are such weak bases that titrations produce only smooth curves. In these cases end-points are undetectable and half-neutralization potentials cannot be determined. For these "non-basic" compounds, the words "No break" are placed in the third column.

TABLE III

| Additive (0.324 M conc.) | Relative Rate | E 1/2 (mv.) |
|---|---|---|
| Group A: | | |
| 1. $(CH_3)_2NNO$ | 1.9 | No break. |
| 2. $HCON(C_6H_5)_2$ | 3.0 | Do. |
| 3. $HCON(CH_3)C_6H_5$ | 2.6 | Do. |
| 4. $(CH_3)_2NCOOCH_3$ | 1-2 | Do. |
| 5. $(CH_3)_2NCN$ | 1-1.5 | 623. |
| 6. $(CH_3)_2NCON(CH_3)_2$ | 6-7 | 546. |
| 7. $HCON(CH_3)_2$ | 7.0 | 625. |
| 8. $CH_3CON(CH_3)_2$ | 8.7 | 530. |
| Group B: | | |
| 9.  $CH_3CON\diagup\diagdown O$ | 4.6 | 546. |
| 10. $HCON\diagup\diagdown O$ | 4.6 | 564. |
| 11. $HCON\diagup\diagdown$ | 6.0 | 553. |
| 12. $HCON\diagup\diagdown$ | 9.7 | 536. |
| Group C: | | |
| 13. $CF_3CON(CH_3)_2$ | 1.7 | No break. |
| 14. $(CH_3)_3CCON(CH_3)_2$ | 4.1 | 460. |
| 15. $C_6H_5CON(CH_3)_2$ | 6.2 | 438. |
| 16. (7-ring) N—CH$_3$ | 7.5 | 374. |
| 17. (6-ring) N—CH$_3$ | 9.9 | 344. |
| 18. (5-ring) N—CH$_3$ | 11.0 | 405. |
| Group D: | | |
| (8). $CH_3CON(CH_3)_2$ | 8.7 | 462. |
| 19. $[(CH_3)_2N]_3PO$ | 54 | 450. |
| Group E: | | |
| 20. 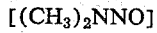 (ring with CH$_3$, SO$_2$, CH$_3$) | 1-2 | No break. |
| 21. $(CH_3)_2SO$ | 15 | 476. |
| 22. $(CH_3)_3PO$ | 25-30 | 431. |
| Group F: | | |
| 23. 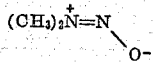 (ring) N—CH$_3$ | 16 | 466. |

Examination of Table III reveals that, with the single exception of dimethylcyanamide (Compound 5), of all the catalysts that exhibit demonstrable basicity, even the least effective ones are more active than the additives which possess no measurable basicity whatsoever. The reason for the inactivity of dimethylcyanamide is that its dipole is restricted to the cyano group, which is not a rigid dipole. In other words for a triatomic dipole to be present, contribution from the form,

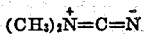

$(CH_3)_2\overset{+}{N}=C=\overset{-}{N}$ would have to be important. From considerations of structural theory, this is unlikely.

More detailed examination of Table III by groups shows that, in many cases, relative basicities cannot be even qualitatively correlated with catalytic activities. In these cases, however, detailed consideration of both linear dipoles and basicity of the oxygen atom at the negative terminus of the dipole lead to a consistent, rational picture for all the alkylation catalysts.

The measured rate constants for the alkylation of sodio-n-butylmalonic ester with n-butyl bromide according to the general procedure given following Table I at 25° C. and 37.44° C. at the specified concentrations with several alkylation catalytic additives are listed in Table IV. The numbers in parentheses denote rate of alkylation relative to that found in the absence of additive at the corresponding temperature. The additives are grouped according to common structural resemblance. Multiple measurements under identical conditions are either averaged or, where possible, statistically pooled.

TABLE IV

| Additive (A) | Conc. of A (M) | $k^{25} \times 10^5$ sec.$^{-1}$ Av.$^b$ | $k^{37.44} \times 10^5$ sec.$^{-1}$ Av.$^b$ |
|---|---|---|---|
| | | No Additive | |
| None | | $^e$ 0.82±.07 | $^e$ 2.31±.11 |
| None | | $^e$ 0.85±.03 | $^e$ 1.91±.11 |
| | | A. Formamide Derivatives | |
| $HCON(CH_3)_2{}^h$ | 0.324 | 5.87±.10 | |
| $HCON(CH_3)_2{}^h$ | 0.324 | 5.83±.09 | 14.99±.14 |
| $HCON(CH_3)_2{}^h$ | 0.324 | 5.81±.06 | 13.05±.18 |
| $HCON(CH_3)_2{}^h$ | 0.324 | 5.84±.10 | 14.13±.11 |
| $HCON(CH_3)_2{}^h$ | 0.324 | 5.40±.16 | 14.60±.17 |
| $HCON(CH_3)_2{}^h$ | 0.324 | $^j$ 6.02±.10 | 13.06±.13 |
| | | $^j$ 5.80 (7.0) | 13.98 (6.6) |
| $HCON(CH_3)_2$ | 0.648 | 15.43±.30 | 43.5±1.04 |
| $HCON(CH_3)_2$ | 0.648 | 15.62±.47 | 43.3±.92 |
| | | $^j$ 15.5 (19) | $^j$ 43.4 (21) |
| $HCON(CH_3)_2$ | 1.296 | 42.7±1.3 | |
| $HCON(CH_3)_2$ | 1.296 | 41.8±0.4 | |
| $HCON(CH_3)_2$ | 1.296 | 43.4±2.4 | |
| | | 42.6 (51) | |
| HCON(4-membered ring) | 0.324 | 7.70±.07 | 17.0±.14 |
| HCON(4-membered ring) | 0.324 | 7.79±.07 | 20.4±.2 |
| HCON(4-membered ring) | 0.324 | 8.78±.15 | 21.4±.08 |
| | | 8.09 (9.7) | 19.6 (9.3) |
| HCON(5-membered ring) | 0.324 | 4.67±.07 | |
| HCON(5-membered ring) | 0.324 | 5.32±.13 | 12.2±.13 |
| HCON(5-membered ring) | 0.324 | 5.06±.08 | 13.5±.17 |
| | | 5.02 (6.0) | 12.8 (6.1) |
| HCON(morpholine) | 0.324 | 3.68±.02 | 9.93±.07 |
| HCON(morpholine) | 0.324 | 3.94±.04 | 9.97±.07 |
| | | 3.81 (4.6) | 9.95 (4.7) |
| | | B. Dimethylacetamide and Variants | |
| $CH_3CON(CH_3)_2$ | 0.324 | 7.43±.08 | |
| $CH_3CON(CH_3)_2$ | 0.324 | 7.05±.05 | |
| | | 7.24 (8.7) | |
| $CH_3CON(CH_3)_2$ | 0.648 | 18.9±.6 (23) | |

See footnote at end of table.

TABLE IV—Continued

| Additive (A) | Conc. of A (M) | $k^{25} \times 10^5$ sec.$^{-1}$ | Av.[b] | $k^{37.44} \times 10^5$ sec.$^{-1}$ | Av.[b] |
|---|---|---|---|---|---|
| CH₃CON(morpholine) | 0.324 | 3.83±.05 | (4.6) | --- | |
| CH₃CSN(morpholine) | 0.324 | 3.76±.30 | (4.6) | --- | |
| (CH₃)₃CCON(CH₃)₂ | 0.324 | 3.41±.05 | (4.1) | --- | |
| (CH₃)₃CCON(CH₃)₂ | 0.648 | 9.13±.09 | (11) | --- | |
| C. Cyclic Amides | | | | | |
| N-vinyl pyrrolidinone | 0.648 | 5.14±.11 | (6.2) | 12.6±.3 | (6.0) |
| N-methyl pyrrolidinone | 0.648 | 23.2±.6 | | 63.2±2.4 | |
| N-methyl pyrrolidinone | 0.648 | 27.3±.8 | | 61.4±1.6 | |
| | | 25.3 | (30) | 61.9 | (29) |
| N-methyl pyrrolidinone (variant) | 0.324 | 9.12±.15 | | --- | |
| N-methyl pyrrolidinone (variant) | 0.324 | 9.38±.10 | | --- | |
| N-methyl pyrrolidinone (variant) | 0.324 | 9.04±.11 | | --- | |
| | | 9.18 | (11) | | |
| N-methyl piperidinone | 0.324 | 8.17±.15 | | --- | |
| N-methyl piperidinone | 0.324 | 8.54±.18 | | --- | |
| N-methyl piperidinone | 0.324 | 7.91±.11 | | --- | |
| | | 8.21 | (9.9) | | |
| N-methyl caprolactam | 0.324 | 5.87±.07 | | --- | |
| N-methyl caprolactam | 0.324 | 6.54±.04 | | --- | |
| N-methyl caprolactam | 0.324 | 6.35±.07 | | --- | |
| | | 6.25 | (7.5) | | |
| N-methyl-2-pyridone | 0.324 | 12.9±0.3 | (16) | 34.4±1.5 | (16) |
| N-methyl-2-pyridone | 0.648 | 49.5±1.4 | (60) | 138±3 | (65) |
| F. Miscellaneous Additives | | | | | |
| C₆H₅CON(CH₃)₂ | 0.324 | 5.14±.04 | (6.2) | --- | |
| C₆H₅CON(CH₃)₂ | 0.648 | 14.7±.19 | (18) | --- | |
| [(CH₃)₂N]₃PO | 0.324 | 44.9±1.4 | (54) | 111±3 | (53) |
| pyridine N-oxide | 0.324 | 15.15±.2 | (18) | 43.3±.9 | (21) |

See footnote at end of table.

TABLE IV—Continued

| Additive (A) | Conc. of A (M) | $k^{25} \times 10^5$ sec.$^{-1}$ Av.[b] | $k^{37.44} \times 10^5$ sec.$^{-1}$ Av.[b] |
|---|---|---|---|
| $(CH_3)_2SO$ | 0.324<br>0.324<br>0.324 | 12.57±.14<br>12.28±.21<br>[l] 11.85±.13 | 38.9±1.3 |
| | | [l] 12.17 (15) | 38.9 (18) |

[b] The number in parentheses after the average rate constant is the relative rate compared to the average rate at the given temperature in the absence of additive, i.e., relative rate=1.0 for $k^{25}=0.83 \times 10^{-5}$sec.$^{-1}$ and for $k^{37.44}=2.11 \times 10^{-5}$sec.$^{-1}$. [c] Rate constant for the first 35% of reaction. Between 35% and 60% of reaction, $k^{25}=0.54\pm0.01 \times 10^{-5}$sec.$^{-1}$. [d] Rate constant for the first 35% of reaction. Between 35% and 60% of reaction, $k^{25}=0.53\pm0.01 \times 10^{-5}$sec.$^{-1}$. [e] Rate constant for the first part of the reaction. The rate was not measured after 35% of completion. [f] Rate constant for the first 20% of reaction. After 20% reaction, $k^{25}=1.18\pm0.08 \times 10^{-5}$sec.$^{-1}$. [g] Rate constant for the first 20% of reaction. After 20%, $k^{25}=1.34\pm0.05 \times 10^{-5}$sec.$^{-1}$. [h] Rate constants for two runs using 0.324 M DMF at 15° C were 2.74±0.07 and 2.48±0.04×10$^{-5}$sec.$^{-1}$ (average=2.61). [i] The statistically pooled value rather than the average was used for calculation of the thermodynamic functions. [j] After a lapse of 18 months, a check run using 0.324 M DMF gave $k^{25}=5.38\pm.07 \times 10^{-5}$sec.$^{-1}$. [k] After a lapse of 19 months, a check run using 0.324 M N-methylformanilide gave $k^{25}=2.24\pm.19 \times 10^{-5}$sec.$^{-1}$. [l] Rate constants for three runs using 0.324 M $(CH_3)_2SO$ at 15° were 5.52±0.12, 4.88±0.09, and 5.17±0.09×10$^{-5}$sec.$^{-1}$ (average=5.19).

In the following specific examples are shown several specific embodiments of the present invention but it should be understood that the invention is not to be limited to the specific reactions disclosed nor to the precise proportions or conditions set forth in the several specific examples, since the examples are given only for the purpose of illustrating the principle of the present invention.

EXAMPLE 1

*Diethyl ethyl-1-methylbutylmalonate*

An alcoholic solution of sodium ethylate is prepared by reacting sodium metal, 4 pounds 13 ounces, with ethyl alcohol, 48 pounds. The solution is cooled to 65–70° C. and diethyl 1-methylbutylmalonate, 46 pounds, is added to form the sodio derivative of diethyl 1-methylbutylmalonate. The reaction mixture is distilled at atmospheric pressure up to a still temperature of about 115–120° C. to remove most of the ethyl alcohol. Thereafter the residual solution is cooled to a temperature of 40–50° C. Dimethylformamide, 48 pounds, is then added to the cooled residual solution and the solution heated to distill off the remaining ethyl alcohol in vacuo. The dimethylformamide solution is then cooled to 10–20° C. and ethyl chloride, 16 pounds, is added from a dropping tank. The system is then closed and the solution heated to a temperature of about 115° C. and maintained at the said temperature for about five hours. The reaction mixture is then cooled and dimethylformamide is removed under vacuum up to a still temperature of 115° C. under a vacuum of 27–27.5 inches. The reaction mixture is cooled and six gallons of water is added with agitation, followed by 4–6 gallons of benzene. The two layers are allowed to separate and the clear water layer is drawn off. An additional six gallons of water is added, agitated, and separated in the same manner. Most of the benzene is removed by distillation at atmospheric pressure and the final traces of benzene removed in vacuo. The product diethyl ethyl-1-methylbutylmalonate distills at a temperature of 144–146° C. at a pressure of 20 mm. mercury to provide a yield of 86.6% theory which assays 97.5% pure. The said product exhibits an index of refraction $n_D^{25}$ 1.4352.

Specific Examples 2 through 26 using dimethylformamide were conducted according to the same procedure as described in Example 1 and in Table V are set forth in the reactants used, resulting reaction product, time of reacting, and yields obtained.

TABLE V

| Example No. | Starting Ester | Alkylating Agent | Reaction Product | Reaction Time | Yield, Percent |
|---|---|---|---|---|---|
| 2 | Diethyl malonate | 1-Methyl-butyl bromide | Diethyl 1-methyl-butyl-malonate | 2 hrs | 82.7 |
| 3 | Diethyl 1-methyl-butyl-malonate | Diethyl sulfate | Diethyl ethyl-1-methyl-butyl-malonate | 15 min | 84.5 |
| 4 | do | Allyl-chloride | Diethyl allyl-1-methyl-butyl-malonate | 20 min | 78 |
| 5 | Diethyl Δ²-cyclo-hexenyl-malonate | do | Diethyl allyl-Δ²-cyclo-hexenyl-malonate | 1.5 hrs | 81 |
| 6 | Diethyl malonate | do | Diethyl allyl-malonate | 1.5 hrs | Not isolated |
| 7 | do | do | Diethyl diallyl-malonate | 15 min | 67 |
| 8 | Diethyl-malonate | Isopropyl bromide | Diethyl isopropyl-malonate | 1 hr | 84 |
| 9 | Diethyl isopropyl-malonate | Diethyl sulfate | Diethyl ethyl-isopropyl-malonate | 20 min | 78.5 |
| 10 | Diethyl malonate | sec-butyl bromide | Diethyl sec-butyl-malonate | 1.5 hrs | 90 |
| 11 | Diethyl sec-butyl-malonate | Ethylchloride | Diethyl sec-butyl-ethyl-malonate | 5 hrs | 90 |
| 12 | Diethyl malonate | n-Butyl bromide | Diethyl n-butyl-malonate | 8 min | 73 |
| 13 | Diethyl n-butyl-malonate | Diethyl sulfate | Diethyl n-butylethyl-malonate | 10 min | 90 |
| 14 | Diethyl malonate | Isoamyl bromide | Diethyl isoamyl-malonate | 30 min | 77.2 |
| 15 | Diethyl isoamyl-malonate | Diethyl sulfate | Diethyl isoamyl-ethyl-malonate | 10 min | 90 |
| 16 | Diethyl benzyl-malonate | Benzyl-chloride | Diethyl dibenzyl-malonate | 1 hr | 75 |
| 17 | Ethyl α-ethyl acetoacetate [1] | n-Propyl bromide | Ethyl α-ethyl-α-n-propyl-acetoacetate | 3 hrs | 63 |
| 18 | Ethyl acetoacetate [1] | Isopropyl bromide | Ethyl α-isopropyl-acetoacetate | 90 min | 61.8 |
| 19 | Ethyl α-ethyl acetoacetate [1] | Benzyl bromide | Ethyl α-ethyl-α-benzyl-acetoacetate | 3 hrs | 62.6 |
| 20 | Ethyl acetone-dicarboxylate [2] | Methyl-iodide | Diethyl α-methyl-β-keto-glutarate | 30 min | 23 |
| 21 | Ethyl cyano-acetate | sec-Butyl bromide | Ethyl α-cyano-β-methyl-valerate | 15 min | 72.5 |
| 22 | Ethyl α-cyano-β-methyl-valerate | Ethyl bromide | Ethyl α-cyano-α-ethyl-β-methyl-valerate | 1.5 hrs | 88 |
| 23 | Diethyl isopropyl-malonate | Ethyl-chloride | Diethyl ethyl-isopropyl-malonate | 5 hrs | 86 |
| 24 | Diethyl n-butyl-malonate | do | Diethyl n-butylethyl-malonate | 5 hrs | 90 |
| 25 | Diethyl isoamyl-malonate | do | Diethyl isoamyl-ethyl-malonate | 5 hrs | 88 |
| 26 | Diethyl-phenyl-malonate | do | Diethyl ethyl-phenyl-malonate | 5 hrs | 91 |

[1] Sodium salt made by reaction with suspension of sodium hydride instead of using sodium metal procedure as in Example 1.
[2] Sodium salt made by reaction with suspension of sodium hydroxide instead of using sodium metal procedure as in Example 1.

Comparable yields of the alkylated products of the preceding Examples 1 through 26 are produced by following the same procedure but using dimethylacetamide in place of dimethylformamide as the alkylation catalyst. The following examples illustrate the alkylation reaction using dimethylacetamide as the catalyst.

EXAMPLE 27

*Diethyl ethyl-1-methylbutylmalonate*

An alcoholic solution of sodium ethylate is prepared by reacting 23.7 g. of sodium metal with 300 cc. of ethyl alcohol, and 230.3 g. of diethyl 1-methylbutylmalonate is added with stirring to the said sodium ethylate solution at 65–75° C. to form an alcoholic solution of the sodio derivative of diethyl 1-methylbutylmalonate. Most of the alcohol is distilled in vacuo and 250 cc of dimethylacetamide is added. The remaining ethyl alcohol is removed in vacuo. Thereafter, 120 g. of ethyl bromide is added at 30–40° C. over a 10-minute period. The reaction temperature is allowed to rise exothermically to 100° C. and then held between about 90–100° C. for 20 minutes. The temperature is allowed to cool to 60° C. whereupon the dimethylacetamide is removed in vacuo. The residual mixture is neutralized with acetic acid and 250 cc. of water is added. The ester phase is extracted with benzene and the benzene extract washed once with 100 cc. of water. The benzene is removed by distillation and the crude ester fractionated in vacuo. The product diethyl ethyl-1-methylbutylmalonate distills at a temperature of 143–145° C. at a pressure of 20 mm. mercury to provide a yield of 84% theory which assays 96.7% pure. The said product exhibits an index of refraction $n_D^{25}$ 1.4350.

Specific Examples 28 through 36 using dimethylacetamide were conducted according to the same procedure as described in Example 1 and in Table VI are set forth the reactants used, resulting reaction product, time of reaction, and yield obtained:

The following examples illustrate the alkylation reaction using dimethylsulfoxide:

EXAMPLE 37

*Diethyl ethyl-1-methylbutylmalonate*

A solution of sodium ethylate is prepared by reacting 300 cc. of ethyl alcohol with 23.46 grams of sodium metal. Distilled diethyl 1-methylbutylmalonate, 230 g., is added to the sodium ethylate solution with stirring at 50–75° C. over a 15-minute period to form the sodio derivative of diethyl 1-methylbutylmalonate. Most of the alcohol is removed by distilling in vacuo (100–150 mm.) and dimethylsulfoxide, 250 cc., is added. The remaining alcohol is removed in vacuo and the dimethylsulfoxide solution transferred to a 1-liter, stainless steel bomb. The dimethylsulfoxide solution is heated to 115–120° C. and ethyl chloride, 77 g., is forced in under pressure over a ½-hour period. The contents of the bomb are heated at 115–120° C. for five hours, then cooled and the dimethylsulfoxide removed in vacuo. The residual ester-sodium chloride mixture is treated with 250 cc. of water and the ester layer extracted with benzene. The benzene solution is concentrated and the ester fractionated. The yield of diethyl ethyl-1-methylbutylmalonate is 85–86% of theory. This material has a boiling point of 144–146° C. at a pressure of 20 mm. mercury and exhibits an index of refraction $n_D^{25}$ 1.4352.

Specific Examples 38 through 45 using dimethylsulfoxide were conducted according to the same procedure as described in Example 1 and in Table VII are set forth the reactants used, resulting reaction product, time of reaction, and yield obtained:

TABLE VII

| Example No. | Starting Ester | Alkylating Agent | Reaction Product | Reaction Time | Yield, Percent |
|---|---|---|---|---|---|
| 38 | Diethyl malonate | 1-methyl-butyl bromide | Diethyl 1-methyl-butyl-malonate | 2 hrs | 84 |
| 39 | Diethyl 1-methyl-butyl-malonate | Allyl-chloride | Diethyl allyl-1-methyl-butyl-malonate | 20 min | 76 |
| 40 | Diethyl benzyl-malonate | Benzyl-chloride | Diethyl dibenzyl-malonate | 1 hr | 75 |
| 41 | Ethyl α-ethyl aceto-acetate [1] | n-Propyl bromide | Ethyl α-ethyl-α-n-propyl-aceto-acetate | 3 hrs | 60 |
| 42 | Ethyl α-ethyl aceto-acetate [1] | Benzyl bromide | Ethyl α-ethyl-α-benzyl-aceto-acetate | 3 hrs | 60 |
| 43 | Ethyl aceto-dicarboxylate [2] | Methyl iodide | Diethyl α-methyl-β-keto-glutarate | 30 min | 25 |
| 44 | Ethyl cyano-acetate | sec-Butyl bromide | Ethyl-α-cyano-β-methyl-valerate | 15 min | 72 |
| 45 | Ethyl α-cyano-β-methyl-valerate | Ethyl bromide | Ethyl α-cyano-α-ethyl-β-methyl-valerate | 1.5 hrs | 87 |

[1] Sodium salt made by reaction with suspension of sodium hydride instead of using sodium metal procedure as in Example 1.
[2] Sodium salt made by reaction with suspension of sodium hydrozide instead of using sodium metal procedure as in Example 1.

EXAMPLE 46

*Diethyl ethyl-1-methylbutylmalonate*

The sodio derivative of diethyl 1-methylbutylmalonate is prepared by slowly adding diethyl 1-methylbutylmalonate, 23 g. (0.1 m.), to a suspension of sodium hydride, 2.4 g. (0.1 m.), in 150 ml. of dry benzene at

TABLE VI

| Example No. | Starting Ester | Alkylating Agent | Reaction Product | Reaction Time | Yield, Percent |
|---|---|---|---|---|---|
| 28 | Diethyl malonate | 1-methyl-butyl bromide | Diethyl 1-methyl-butyl-malonate | 2 hrs | 80 |
| 29 | Diethyl 1-methyl-butyl-malonate | Allyl-chloride | Diethyl allyl-1-methyl-butyl-malonate | 20 min | 75 |
| 30 | Diethyl-benzyl-malonate | Benzyl-chloride | Diethyl-dibenzyl-malonate | 1 hr | 76 |
| 31 | Ethyl α-ethyl acetoacetate [1] | n-Propyl bromide | Ethyl α-ethyl-α-n-propyl-acetoacetate | 3 hrs | 60 |
| 32 | Ethyl acetoacetate [1] | Isopropyl-bromide | Ethyl α-isopropyl-acetoacetate | 90 min | 61 |
| 33 | Ethyl α-ethyl acetoacetate [1] | Benzyl-bromide | Ethyl α-ethyl-α-benzyl-acetoacetate | 3 hrs | 62 |
| 34 | Ethyl acetone-dicarboxylate [2] | Methyl-iodide | Diethyl α-methyl-β-keto-glutarate | 30 min | 25 |
| 35 | Ethyl cyano-acetate | sec-butyl-bromide | Ethyl α-cyano-β-methyl-valerate | 15 min | 70 |
| 36 | Ethyl α-cyano-β-methyl-valerate | Ethyl bromide | Ethyl α-cyano-α-ethyl-β-methyl-valerate | 1.5 hrs | 85 |

[1] Sodium salt made by reaction with suspension of sodium hydride instead of using sodium metal procedure as in Example 1.
[2] Sodium salt made by reaction with suspension of sodium hydroxide instead of using sodium metal procedure as in Example 1.

Comparable yields of the alkylated products of Examples 1 through 26 can also be obtained by following the procedure specified in the said examples wherein dimethylsulfoxide is used in place of dimethylformamide.

room temperature. As soon as the reaction is complete pyridine N-oxide, 10 gr., is added to the solution of the said sodio derivative followed by 11 g. (0.1 m.) of ethyl bromide. The mixture is then heated for about three hours, cooled, and sodium bromide is removed by filtering the reaction mixture. The solvent is removed by distillation, the residue is treated with water, the organic phase extracted with ether, and the ether solution is dried over sodium sulfate. The solution is then concentrated to remove the solvent and distilled under vacuum to obtain the product diethyl ethyl-1-methylbutylmalonate which boils at a temperature of 144–146° C. at a pressure of 20 mm. mercury and exhibits a refractive index $n_D^{25}$ 1.4352.

Trimethylphosphine oxide being a solid, is also used in a solvent, such as benzene, in the same manner as pyridine N-oxide of Example 46. And, as is evident from the date in the tables, both pyridine N-oxide and trimethylphosphine oxide are also very efficient catalysts for ethylating diethyl 1-methylbutylmalonate.

EXAMPLE 47

*Diethyl ethyl-1-methylbutylmalonate*

A solution of sodium ethylate is prepared by reacting 300 cc. of ethyl alcohol with 23.0 g. of sodium metal. Distilled diethyl 1-methylbutylmalonate, 230.3 g., is added to the sodium ethylate solution with stirring at 50–75° C. over a 15-minute period to form the sodio derivative of diethyl 1-methylbutylmalonate. Hexamethylphosphoramide, 200 cc., is added to the foregoing solution and ethyl alcohol removed by distilling in vacuo. Ethyl bromide, 70 g., is added at 20° C. over a 15-minute period with cooling. After the addition is completed, the mixture is heated to about 110° C. and maintained at said temperature for about 90 minutes. The reaction mixture is cooled and a sufficient quantity of water and benzene is added with agitation. Two layers are allowed to separate and the clear water layer drawn off. An additional amount of water is added, agitated, and separated in the same manner. Most of the benzene is removed by distillation at atmospheric pressure and the final traces of benzene removed in vacuo. The product diethyl ethyl-1-methylbutylmalonate distills at a temperature of 144–146° C. at a pressure of 20 mm. mercury.

EXAMPLE 48

*Diethyl n-butylmalonate*

A solution of sodium ethylate is prepared by reacting 750 cc. of ethyl alcohol and 58.1 g. of sodium metal. Redistilled diethyl malonate, 400.5 g., is added to the sodium ethylate solution with stirring at a temperature of 50–75° C. over a 20-minute period. N-methyl-epsilon-caprolactam, 400 cc., is added to the foregoing solution and ethyl alcohol removed by distilling in vacuo. To the foregoing solution is added n-butyl bromide, 360 g., at a temperature of 85–90° C. over a 10-minute period with cooling. The reaction mixture is held at a temperature of 85–90° C. for about seven minutes without external heating and thereafter is heated to 100° C. and held at said temperature for about eight minutes. Thereafter, the reaction mixture is neutralized with acetic acid and the N-methyl-ε-caprolactam removed by distilling in vacuo. Water is then added and the organic ester phase is separated and the aqueous phase extracted with ether, dried, and concentrated on a steam bath. The crude ester phase and the ether concentrate are distilled to yield diethyl n-butylmalonate which boils at a temperature of 114–117° C. at a pressure of 10 mm. mercury. The product exhibits a refractive index $n_D^{25}$ 1.4216.

EXAMPLE 49

*Diethyl ethyl-1-methylbutylmalonate*

Sodium ethylate is prepared by reacting sodium metal, 15 grams, with ethyl alcohol, 200 cc. The solution is cooled to 65–70° C. and diethyl 1-methylbutylmalonate, 145 gr., is added to form the sodio derivative of diethyl 1-methylbutylmalonate. The reaction mixture is distilled at atmospheric pressure up to a still temperature of about 115–120° C. to remove most of the ethyl alcohol. Thereafter, the residual solution is cooled to a temperature of 40–50° C. N-methyl-2-pyrrolidone, 140 cc., is then added to the cooled residual solution and the solution heated to distill off the remaining ethyl alcohol in vacuo. The N-methyl-2-pyrrolidone solution is then cooled to 10–20° C. and ethyl bromide, 75 grams, is added from a dropping tank. The system is then closed and the solution heated to a temperature of about 115° C. and maintained at the said temperature for about five hours. The reaction mixture is then cooled and catalyst is removed under vacuum. The reaction mixture is cooled and water is added with agitation, followed by benzene. Two layers are allowed to separate and the clear water layer is drawn off. An additional amount of water is added, agitated, and separated in the same manner. Most of the benzene is removed by distillation at atmospheric pressure and the final traces of benzene removed in vacuo. The product diethyl ethyl-1-methylbutylmalonate distills at a temperature of 144–146° C. at a pressure of 20 mm. mercury.

EXAMPLE 50

*Diethyl 1-methylbutylmalonate*

A solution of sodium ethylate is prepared by reacting 300 cc. of ethyl alcohol and 23.0 g. of sodium metal. Redistilled diethyl malonate, 160 g., is added with stirring to the said sodium ethylate solution at 75° C. over a 15-minute period to form an alcoholic solution of the sodio derivative of diethyl malonate. N-methyl-2-pyridone, 200 cc., is added to the latter solution with cooling and the resulting solution is concentrated in vacuo to remove ethanol. The residual solution is heated to 85° C. and 1-methylbutyl bromide, 158 g., is added over a 15-minute period. Sodium bromide starts to separate after approximately one-third of the bromide is added. After the addition is completed, the reaction mixture is heated to 105° C. The temperature rises spontaneously to about 115° C. and remains at that temperature for 10 minutes before receding. The temperature is maintained at 115° C. for 2 hours, then glacial acetic acid is added to neutralize the reaction mixture. The N-methyl-2-pyridone is distilled in vacuo and the residue is treated with water, 200 cc., and the organic layer extracted with ether (or benzene). The extracts are dried over anhydrous magnesium sulfate, filtered, and concentrated in vacuo. The crude product diethyl 1-methylbutylmalonate distills at a temperature of 131–133° C. at a pressure of 20 mm. mercury and exhibits a refractive index of $n_D^{25}$ 1.4262.

It will be apparent from the foregoing specific examples that the present invention is particularly useful in making it possible to introduce very readily an alkyl group into a malonic ester, even those which are already substituted by a hydrocarbon substituent group, such as a monocyclic aryl, an alkyl, an alkenyl, a cycloalkenyl, or an aralkyl group; thereby enabling substituted malonic esters and similar compounds useful for the preparation of barbituric acid derivatives to be prepared much more readily and more economically than heretofore. Thus, for example, it is now commercially possible to introduce first the larger alkyl group, such as the 1-methylbutyl group, or a phenyl group, into an unsubstituted malonic ester, with or without using the reaction solvent alkylation catalyst, and easily recover the desired mono-substituted malonic ester product in a highly pure form, and thereafter introduce the lower alkyl group, such as the ethyl or propyl group, into the said mono-substituted malonic ester product by means of the preferred embodiment of the herein disclosed process using ethyl chloride as the alkylating agent in a reaction medium comprising one of the herein disclosed reaction alkylation catalysts, such as dimethylformamide, or, if desired, with the dimethylformamide mixed with an inert solvent, such as benzene, toluene or xylene. The latter alkylation reaction proceeds to completion rapidly and produces the desired di-substituted malonic ester in very high yields. The foregoing is in marked contrast with the procedures heretofore required wherein under commercial conditions it has been necessary to introduce first the smaller of the two alkyl substituents, for example, into the said malonic ester by prolonged heating of the alkyl bromide or dialkyl sulfate with the result that a very substantial proportion of dialkyl product is formed which makes it extremely difficult to recover the desired mono-alkylated product directly from the reaction mixture in a pure form. Heretofore, the second larger alkyl group was then introduced into the mono-alkylated malonic ester only after prolonged heating with one of the more active alkylating agents, such as the alkyl bromide or dialkyl sulfate; and could not be introduced commercially by heating with the less reactive and less expensive alkyl chlorides. It will thus be apparent that the present invention greatly shortens and simplifies the preparation of many malonic ester compounds which are suitable for use in the manufacture of barbituric acid derivatives having wide pharmaceutical utility as anesthetics and hypnotics.

In the specification and claims, the term "alkylating agent" is used to designate a compound capable of replacing a hydrogen or metallo atom of an organic compound with an acyclic or alicyclic aliphatic group and including such compounds as the alkyl, cycloalkyl, alkenyl, cycloalkenyl, and aralkyl halides and disulfates. Because of their relatively low cost, the alkyl halides, and particularly the lower alkyl chlorides, such as ethyl chloride or propyl chloride, are the preferred alkylating agents of the present invention which makes for the first time the use of the less reactive alkyl chlorides commercially possible. It should be understood, however, that the other halides, such as the alkyl bromides and iodides, and the said disulfates, such as dialkyl sulfate, dialkenyl sulfate, and diaralkyl sulfate, are also suitable for use in the present invention, if desired.

The present application is a continuation-in-part application of our co-pending patent applications Serial No. 512,878, filed June 2, 1955; Serial No. 517,932, filed June 24, 1955; and Serial No. 566,096, filed February 17, 1956. All the foregoing applications have now been abandoned.

Others may readily adapt the invention for use under various conditions of service, by employing one or more of the novel features disclosed or equivalents thereof. As at present advised with respect to the apparent scope of our invention, we desire to claim the following subject matter.

We claim:

1. A method of introducing a radical selected from the group consisting of loweralkyl and benzyl into an ester selected from the group consisting of diloweralkyl malonates, loweralkyl acetoacetates and loweralkyl cyanoacetates which comprises reacting an alkali metal salt of said ester with a member of the group consisting of loweralkyl chlorides, loweralkyl bromides, loweralkyl iodides, benzyl chloride, benzyl bromide, benzyl iodide, diloweralkyl sulfates and dibenzylsulfate in the presence of a catalyst selected from the group consisting of tetramethylurea, N-formylpyrrolidine, trimethylphosphine oxide, pyridine N-oxide, hexamethylphosphoramide, N-formylpiperidine, N,N-dimethylbenzamide, N-methyl-epsilon-caprolactam, N-methyl-2-piperidone, N-methyl-2-pyrrolidone and N-methyl-2-pyridone.

2. A method for the preparation of diethyl ethyl-1-methylbutylmalonate which comprises reacting equimolar quantities of sodium diethyl 1-methylbutylmalonate and ethyl bromide in the presence of a catalytic amount of pyridine N-oxide.

3. A method for the preparation of diethyl ethyl-1-methylbutylmalonate which comprises reacting equimolar quantities of sodium diethyl-1-methylbutylmalonate and ethyl bromide in the presence of a catalytic amount of trimethylphosphine oxide.

4. A method for the preparation of diethyl ethyl-1-methylbutylmalonate which comprises reacting equimolar quantities of sodium diethyl-1-methylbutylmalonate and ethyl bromide in the presence of a catalytic amount of hexamethylphosphoramide.

5. A method for the preparation of diethyl ethyl-1-methylbutylmalonate which comprises reacting equimolar quantities of sodium diethyl-1-methylbutylmalonate and ethyl bromide in the presence of a catalytic amount of N-methyl-2-pyrrolidone.

6. A method for the preparation of diethyl-n-butyl-malonate which comprises reacting equimolar quantities of sodium diethylmalonate and n-butyl bromide in the presence of a catalytic amount of N-methyl-epsilon-caprolactam.

7. A method for the preparation of diethyl 1-methylbutylmalonate which comprises reacting equimolar quantities of sodium diethylmalonate and 1-methylbutyl bromide in the presence of a catalytic amount of N-methyl-2-pyridone.

References Cited in the file of this patent

UNITED STATES PATENTS

| | | |
|---|---|---|
| 2,365,898 | Morris et al. | Dec. 26, 1944 |
| 2,438,241 | Wallingford et al. | Mar. 23, 1948 |
| 2,812,324 | Huber et al. | Nov. 5, 1957 |

OTHER REFERENCES

Hoffman: J. Org. Chem. 15, 425–434 (1950).
Fuson: "Advanced Organic Chemistry," 1950, pages 413–415 and 418–422.
Shapira et al.: J. Am. Chem. Soc. 75, 3655–7 (1953).